United States Patent [19]

Ripka

[11] 3,718,673

[45] Feb. 27, 1973

[54] PROCESS FOR THE PREPARATION OF 21-CHLORO-6,6,9ALPHA-TRIFLUORO-11BETA, ALPHA, 17ALPHA-TRIHYDROXY-1,4-PREGNADIEN-3,20-DIONE 16,17-KETALS AND SELECTED INTERMEDIATES

[75] Inventor: William Charles Ripka, Wilmington, Del.

[73] Assignee: E. I. du Pont de Nemours and Company, Wilmington, Del.

[22] Filed: Feb. 1, 1971

[21] Appl. No.: 111,615

[52] U.S. Cl.....260/397.3, 260/239.55 D, 260/397.4, 260/397.45, 424/241, 424/243, 195/51

[51] Int. Cl............................................C07c 173/00

[58] Field of Search............260/397.3, 397.4, 397.45

[56] References Cited

UNITED STATES PATENTS 3,338,893   8/1967   Beard et al. .....................260/239.55
3,546,215   12/1970  Fried..............................260/239.55

Primary Examiner—Elbert L. Roberts
Attorney—Anthony P. Mentis

[57] ABSTRACT

6,6-Difluoro-11α,16α,17α-trihydroxy-4-pregnen-3,20-dione 16,17-ketal 17-ketal is prepared by a process involving the 11α-microbiological hydroxylation of the corresponding 16α,17α-dihydroxy steroid. The 11α-hydroxyl is converted sequentially to the 9,11-double bond, 9,11-epoxy and 9α-fluoro-11β-hydroxyl. Optionally the 1,2-position is dehydrogenated and a 21-hydrogen converted to a 21-hydroxy, acyloxy, bromine or chlorine. The latter steroid ketals are highly active anti-inflammatory and glucocortical agents.

8 Claims, No Drawings

PROCESS FOR THE PREPARATION OF 21-CHLORO-6,6,9ALPHA-TRIFLUORO-11BETA, ALPHA, 17ALPHA-TRIHYDROXY-1,4-PREGNADIEN-3,20-DIONE 16,17-KETALS AND SELECTED INTERMEDIATES

BACKGROUND OF THE INVENTION

1. Field of the Invention

This invention relates to an improved process for the preparation of certain 21-substituted 6,6-difluoro-3,20-diketo-11β,16α,17α-trihydroxy-4-pregnene 16,17-ketals, which are useful as antiinflammatory and glucocorticoid agents suitable for treatment of allergic, collagen or skin diseases and the like. Novel precursors and selected derivatives are described.

2. Prior Art 6,6-Difluoro-4-pregnene-3,20-dione has been prepared by the process of Boswell U.S. Pat. No. 3,219,673. In my commonly assigned copending application Ser. No. 31,001 filed Apr. 22, 1970 it has been demonstrated that 3β,16α,17α,21-tetrahydroxy-5-pregnen-20-one 16,17-acetonide underwent a series of reactions with nitrosyl fluoride, alumina, sulfur tetrafluoride, and 11β-hydroxylation (by a microbiological technique) to give an antiinflammatory agent. Further reactions introduced a 9α-fluorine and Δ¹-unsaturation to provide an even more potent biological agent. In the above sequence of reactions, the yield of the 11β-hydroxylation is generally quite low and this class of antiinflammatory compounds thus obtained, although very potent, are expensive.

It is known that certain steroids can be microbiologically hydroxylated in the 11-position by selected strains of organisms. The corticoidal activity is in the 11β-configuration which is obtained by incubating with *Curvularia* microorganisms. Although U.S. Pat. No. 3,471,477 indicates this reaction is effective for 6-fluorosteroids, it is known from U.S. Pat. No. 3,530,038 to be dependent upon the substituents on the steroid. Fluocinolone acetonide is prepared commercially by 11β-hydroxylation on a 6α-fluoro precursor. However, attempts to carry out the same reaction on 6α,6β-difluoro steroids give extremely low yields. Hydroxylation by selected organisms is also known to give 11α-hydroxyl. This has been applied to a 6α-monohalo pregnene as shown in U.S. Pat. No. 3,033,759. Even if applicable to 6,6-difluoro steroids, several further transformations would be needed to convert this to the 11β compound, which is the isomer needed for antiinflammatory use.

SUMMARY OF THE INVENTION

According to this invention new compounds of the formula

I

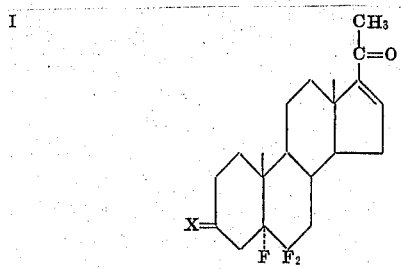

wherein
X is

and R' is acyl of up to four carbon atoms, particularly acetyl,
are converted by a sequence of reactions to further novel compounds of the formula

II

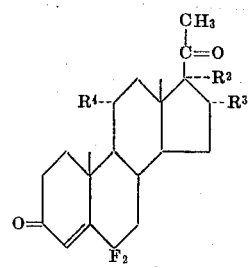

wherein R² and R³ are each OH, or together are a double bond between the C–16 and C–17 carbon positions, and R⁴ is H or OH, with the proviso that R⁴ is H when R² and R³ are a double bond.

These compounds in turn are converted by a sequence of reactions to further novel compounds of the formula:

(III)

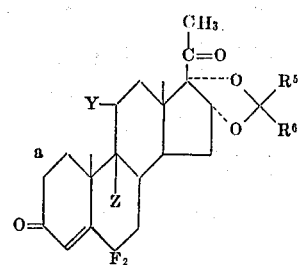

wherein
 a is a single or double bond; R⁵ and R⁶, alike or different are phenyl; alkyl of up to 5 carbon atoms; cycloalkyl of five or six carbon atoms; or together are tetramethylene or pentamethylene; Y is β—OH and Z is α-Br and α-F;
 Y is α—OH and Z is α—H; and
 Y and Z together are β-epoxy or a double bond between the C–9 and C–11 positions.

The particularly novel and important reaction is in the 11α-microbiological hydroxylation of steroids of the formula

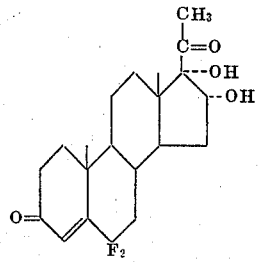

by selected organisms to provide a high yield of the 11α-hydroxyl. The latter is converted by a series of reactions, as herein-after shown to give the 11β-hydroxyl, necessary for high corticordal activity.

DETAILED DESCRIPTION OF THE INVENTION

It has now been discovered that 6,6-difluoro-3,20-diketo-16α,17α-dihydroxy-4-pregnene can be microbiologically hydroxylated to the 11α-hydroxyl in good yields. The complete process starting with a readily available pregnene is illustrated by the following reaction scheme:

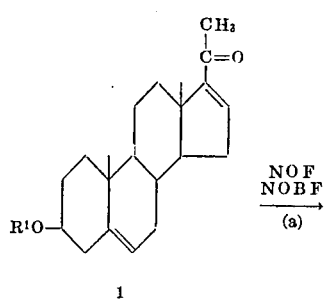
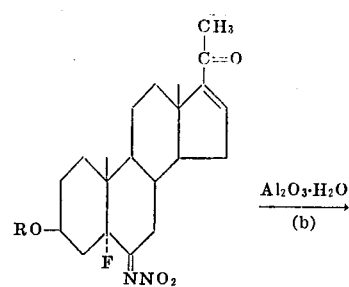
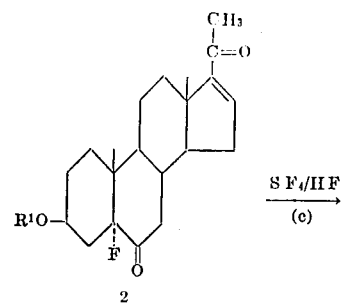
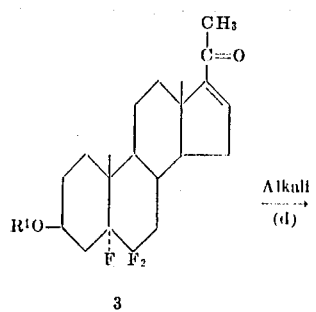
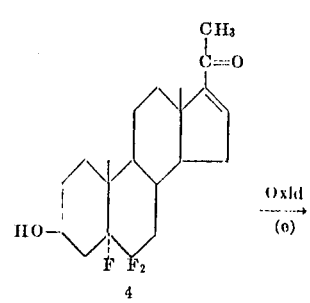
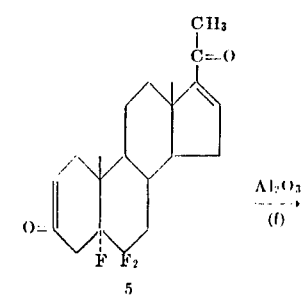
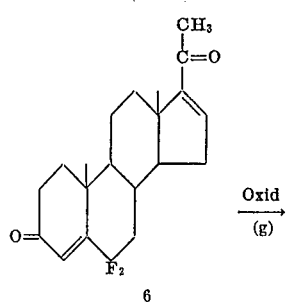
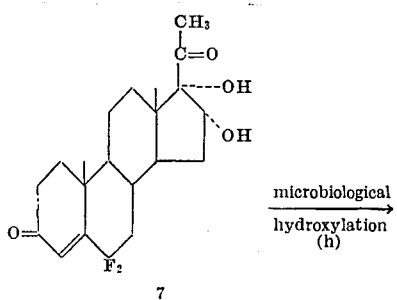
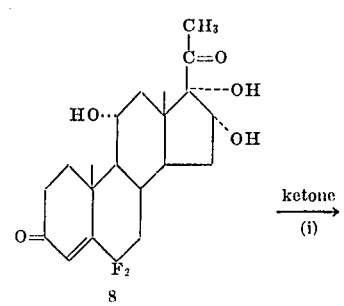
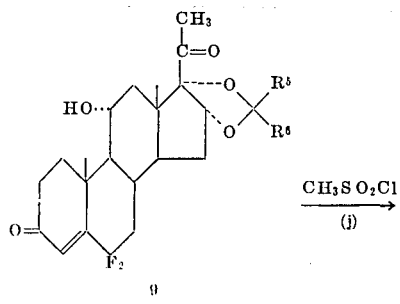
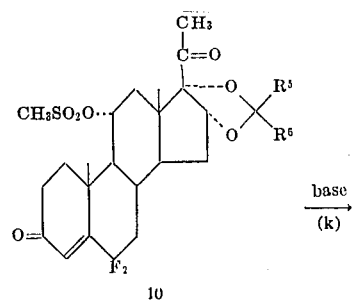
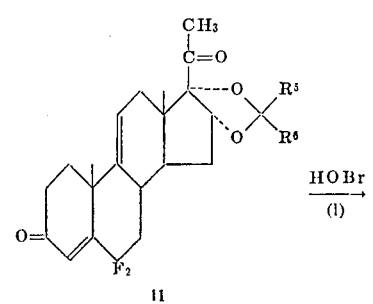
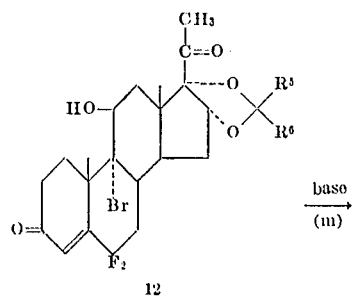
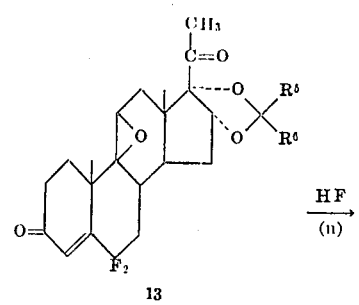
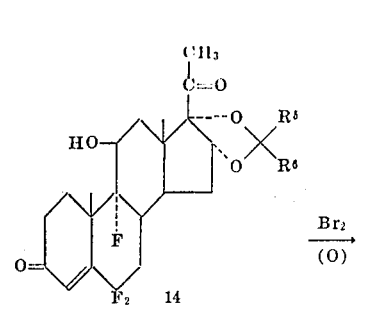

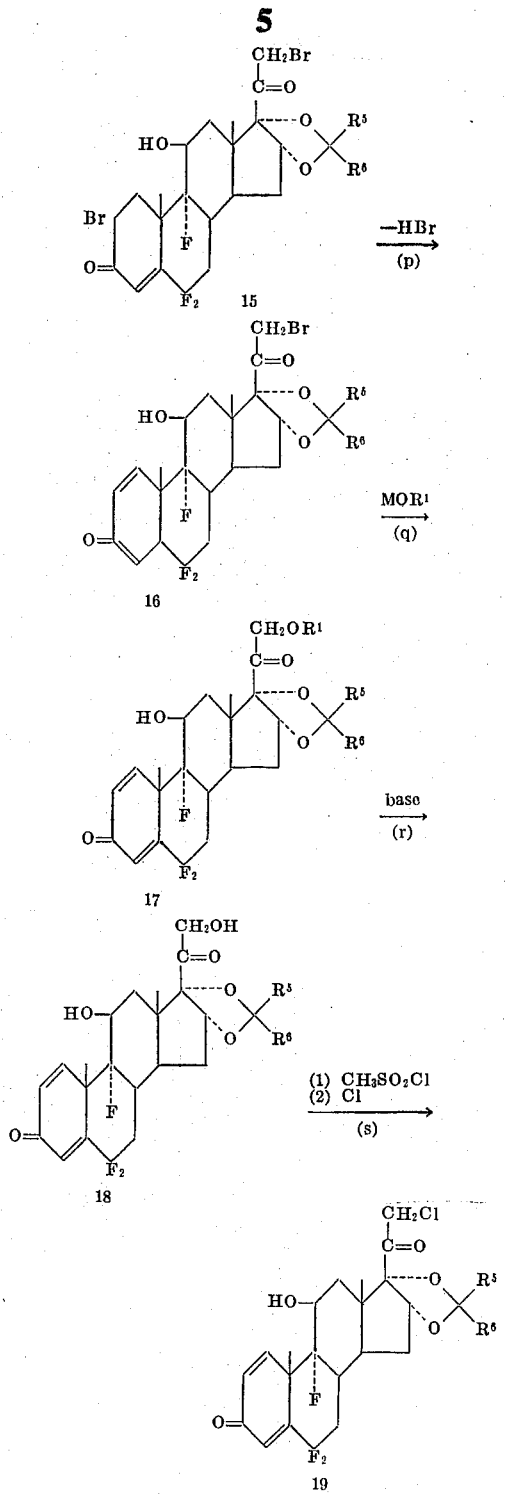

The starting steroid used in this reaction scheme is readily available. In the above procedures the R¹ group represents a lower alkanoyl radical, e.g., acetyl, propionyl or butyryl, in the 3- or 21-positions where applicable. Generally, however, the acetyl is preferred since it is readily available and reactive.

R⁵ and R⁶ of the ketal grouping usually are methyl as in the acetonide but can also be individually such other groups as, for example, ethyl, propyl, isopropyl, butyl, isobutyl, pentyl, hexyl, cyclopentyl or cyclohexyl and can together form the tetramethylene or pentamethylene radical. The desired ketal is prepared from the appropriate ketone and the 16α, 17α- dihydroxy steroid in the presence of an acid catalyst.

The first step (a) of the instant process, the reaction of a 3-alkanoyl- $\Delta^{5,16}$-pregnadiene with nitrosyl fluoride at the 5,6-positions is carried out in an inert solvent; for instance, a halogenated hydrocarbon, such as methylene chloride, chloroform, carbon tetrachloride, fluorodichlormethane, and ethylene chloride, or mixtures of these with glyme, acetonitrile, and sulfolane. Nitrosyl tetrafluoroborate can be added with nitrosyl fluoride in this step. A mixture of these two materials is much more efficient than nitrosyl fluoride alone. Higher yields of 5-fluoro-6-nitriminopregnene are obtained in this manner. Nitrosyl tetrafluoroborate, which is a crystalline solid, can also be made in situ by using a mixture of nitrosyl fluoride and of boron trifluoride. The molar ratio of nitrosyl fluoride to nitrosyl tetrafluoroborate in the mixture can be varied within rather broad limits, e.g., 50:1 to 1:50. Usually the optimum ratio is 1:1.

The amount of nitrosyl fluoride employed must, of course, be at least stoichiometric, i.e., two moles per mole of the starting $\Delta^5$-pregnene. However, it is advantageous to use an excess of nitrosyl fluoride. An initial molar ratio of nitrosyl fluoride to the $\Delta^5$-pregnene of about 3 to 1 has been found to be particularly practical, high yields of the 5-fluoro-6-nitrimino-16-pregnene being obtained in short times.

The reaction is carried out at moderate temperatures, preferably no higher than about 100°C and especially within the range of about −10° to 30°C. Within this range, the reaction rates are satisfactory and can be easily controlled. Atmospheric pressure is sufficient, although higher pressures may sometimes be required to maintain a sufficient concentration of the reactants at the reaction temperatures. Moisture is undesirable in this step because of the danger of NOF and/or NOBF₄ hydrolysis.

The nitrosyl fluoride adduct obtained in the first step, the 5-fluoro-6-nitrimino-16-pregnene, can be isolated in any conventional manner, such as for example evaporation of the solvent and recrystallization of the residue. In practice, this isolation and purification step is not required, and the crude solution can be directly subjected to the next step (b), i.e. conversion of the nitrimino group to the keto group.

The solution may be contacted with a weak base, such as an aqueous alkali bicarbonate, to remove excess NOF and/or NOBF₄ and acidic reaction side products. The solution is chromatographed on neutral alumina containing 5–15 percent by weight of water (activity grade III). The 5-fluoro-6-keto-16-pregnene formed in this step is eluted with a suitable solvent or a solvent combination, such as aliphatic or aromatic hydrocarbons. Instead of the chromatographic technique, any other suitable technique for contacting the fluoronitrimino-16-pregnene with wet alumina can be used; for example, vigorously stirring a suspension of alumina in the fluoronitriminopregnene solution of the steroid in aqueous dioxane.

The reaction of the 5-fluoro-6-keto-16-pregnene obtained from step (b) with sulfur tetrafluoride/hydrogen fluoride or sulfur tetrafluoride/Lewis acid mixture is carried out in step (c) in an inert solvent of the same type as those used in the first step, i.e., methylene chloride, chloroform, carbon tetrachloride, fluorodichloromethane, ethylene chloride, and the like. Sulfur tetrafluoride can be replaced by selenium tetrafluoride or by an organosulfur fluoride, such as phenylsulfur trifluoride, but sulfur tetrafluoride is the cheapest and the most readily available reagent. Since both sulfur tetrafluoride and hydrogen fluoride are gases at the reaction temperature, it is practical to carry out this step in a closed reactor, such as a shaking autoclave. The reaction is best carried out at moderate temperatures, below about 100°C, and preferably at -10 to 30°C. It usually is not practical to lower the temperature below about −10°C because the reaction rates are too low for an efficient operation.

The relative proportions of sulfur tetrafluoride and of hydrogen fluoride can be varied within a rather broad range; the molar proportion of hydrogen fluoride in admixture with sulfur tetrafluoride can be as low as zero or as high as about 90 percent, the 15–20 percent range being preferred. Although other fluoro Lewis acids, such as $BF_3$ and $SbF_5$, can be used, hydrogen fluoride, either added directly or generated in situ is preferred. Hydrogen fluoride can be generated in situ by adding to the reaction mixture a compound containing at least one active hydrogen, such as water or alcohol. Reaction of such an active hydrogen-containing compound with sulfur tetrafluoride liberates hydrogen fluoride. The 5,6,6-trifluoro-16-pregnene can be recovered by conventional methods, such as evaporation of solvent and recrystallization of the residue or column chromatography.

Hydrolysis of the C-3 ester group (step d) is readily accomplished by contacting a solution of the steroid in a water-miscible solvent with aqueous alkali, such as sodium or potassium carbonate, or sodium hydroxide. This step is usually carried out at room temperature, but the temperature range of about −10° to 35°C can conveniently be employed. Suitable solvents include lower alcohols, such as methyl, ethyl, propyl, isopropyl and t-butyl; and water-miscible ethers, such as tetrahydrofuran and dioxane. Methyl alcohol/tetrahydrofuran mixtures are preferred because of their good solvent properties towards both the steroid compound and the aqueous alkali.

The 3-hydroxyl is then oxidized to the 3-keto group (step e) in any conventional manner known to the art, e.g., with chromic acid. The preferred reagent is a solution of chromic acid and sulfuric acid in water [L. F. Fieser and M. Fieser, *Reagents for Organic Synthesis*, John Wiley & Sons, p. 142 (1967)]. The 3-hydroxysteroid is dissolved in a water-miscible solvent, such as an ether or a ketone, e.g., dioxane, tetrahydrofuran, acetone, or methyl ethyl ketone. The reaction is carried out at or below room temperature, although a temperature of up to about 35°C can be used.

Dehydrofluorination of the 5-keto-5,6,6-trifluoro-16-pregnene to the $\Delta^4$,16-3-keto-6,6-difluoropregnadiene is done in the presence of a base, such as alumina, potassium carbonate, silver oxide, potassium hydroxide, or lithium carbonate (step f). Although a nonaqueous medium, such as methanol or ethanol is desirable, the reaction sometimes can be carried out in the presence of water. The dehydrofluorination occasionally requires heating, even to reflux, but usually is accomplished at about room temperature.

Oxidation of the C-16, C-17 double bond without effect on that between C-4 and C-5 (step g) is carried out with oxidizing agents such as potassium permanganate in acetone/acetic acid at 0–10°C. Other agents for this transformation such as osmium tetroxide are also effective.

Microbiological hydroxylation that takes place in the 11α-position is carried out by the general technique employed for 11β hydroxylation except that the microorganism must be specific to one that introduces the desired configuration. The organism is generally grown on an agar slant medium useful to propogate the organism and the latter then introduced into liquid culture flasks and then agitated for several days with the steroid, following which the 11α-hydroxy steroid is extracted. Useful organisms for the 11α-hydrox-ylation are of *Aspergillus* family as described in U.S. Pat. No. 3,033,759. A further useful organism is *Rhizopus nigrican*. The surprising feature is that the yields are quite high for the 11α-hydroxylation of 6,6-difluorosteroids whereas 11β-hydroxylation is very low.

Conversion of the 16α,17α-hydroxyls to acetals, e.g., acetonide, with the ketones mentioned above takes place with an acid catalyst (step i). This leaves the 11α-hydroxyl as the only hydroxyl which can be esterified and removed (use of a sulfonyl halide such as p-toluene-sulfonyl chloride, or methanesulfonyl chloride generally at 0–25°C, followed by treatment with an alkali metal alkanoate at 50–100°C, j and k) to give the 9–11 unsaturation.

Addition of the preceding steroid with hypohalous acid (which can be generated in situ and reacted at 20–35° C gives the 11β-hydroxy-9α-halo steroid. Preferred is the hypobromous acid as shown in (1). Treatment of the latter with a base, preferably an alkali metal alkanoate at 50–100°C results in the 9,11-positions giving the corresponding epoxy (also called oxido or oxy) as shown in equation m.

The latter epoxy steroid reacts with HF suitably added as a complex of HF with a base such as urea to about room temperature (n). The steroid thus formed has the desired configuration for enhanced corticosteroid activity, namely a 11β-hydroxyl and 9α-fluorine.

Further transformations to even more active anti-inflammatory steroid can be effected by conversion of a 21-hydrogen to hydroxy or halogen, especially chlorine and also dehydrogenation at the 1,2-position to give the $\Delta^{1,4}$-steroid. One scheme is shown in equations o,p,q,r, and s. The $\Delta^1$-unsaturation can optionally be introduced by a microbiological dehydrogenation with *Arthrobacter simplex* or by chemical means such as dichlorodicyanoquinone or equivalent dehydrogenation agents. The $\Delta^1$-unsaturation can be introduced at any stage by the latter methods after step n, i.e., after the β-hydroxyl has been formed.

Selected pregnenes with an 11β-hydroxyl are useful in the treatment of allergic, collagen, skin and muscu-losketal diseases. They can be administered orally, parenterally or topically with dosage rates in the range of 0.0001 to 1 mg. per kg. of body weight per day.

New intermediates to the highly active corticosteroids (as obtained by use of all or the main sequential reactions) are represented by the formulas previously shown. Intermediates can also be used as progestational agents or as antiandrogens.

SPECIFIC EMBODIMENTS OF THE INVENTION

The following examples are illustrative, not limitative, of the practice of the invention. All parts are by weight unless stated otherwise.

The following detailed description shows the procedure employed starting with a readily available pregnadiene. The 11α-hydroxylation is illustrated in part F. Although various of the compounds obtained are active the procedure shows ultimate preparation of the highly active topical anti-inflammatory 21-chloro-6,6,9α-trifluoro-11β,16α,17α,-trihydroxy-1,4-pregnadien-3,20-dione 16,17-acetonide.

EXAMPLE 1

A. 5α-Fluoro-3β-hydroxy-16-pregnen-6,20-dione Acetate (2)

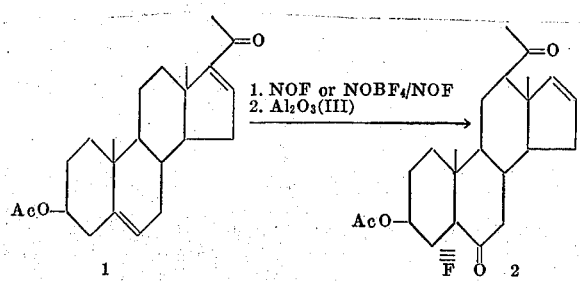

3β-Hydroxy-5,16-pregnadien-20-one acetate (1) (75 g, 0.211 mole) in 600 ml of methylene chloride, cooled to 0°, was treated with 25 g (0.51 mole) of nitrosyl fluoride. The reaction was stirred at 0° for 3 hrs. then carefully washed with aqueous sodium bicarbonate, water and brine. The organic layers were dried with anhydrous magnesium sulfate and the solvent evaporated to give a viscous green oil. This oil in benzene was applied to a column of 3 kg of alumina III packed in hexane and the product was eluted with benzene to yield 45 g (55 percent) of material. Crystallization from methanol gave 38.1 g (46.5 percent), m.p. 199–201 of 5α-fluoro-3β-hydroxy-16-pregnen-6,20-dione acetate (2).

In an alternative and preferred procedure, the same initial steroid (1) (125 g, 0.35 mole) in 500 ml of methylene chloride was added to a mixture of 40 g (0.342 mole) of nitrosyl tetrafluoroborate in 500 ml of glyme cooled to 0°. At the same time nitrosyl fluoride (40 g, 0.815 mole) was bubbled in over 1 hr. The reaction was stirred for 4 hrs. at 0° then poured into cold brine. The organic layer was separated, washed twice more with brine, then evaporated by a stream of nitrogen to give a viscous green oil (volume of ca 300 ml). This was slurried with 3 kg of alumina III in 1 l. of hexane. After stirring for 4 hrs the product was eluted from the alumina with benzene (8 l.) to give 99 g of crude material. Recrystallization from methanol gave 82.3 g. Chromatography of the motor liquors on Florisil gave an additional 8.0 g for a total of 90.3 g (66 percent) of steroid (2). An analytical sample was crystallized from acetone-hexane, m.p. 196–197.5.

Anal. Calcd. for $C_{23}H_{31}O_4F$: C, 70.74; H, 7.99; F, 4.86

Found: C, 70.41, 70.70; H, 7.58, 8.05; F, 4.81, 4.85.

Ultraviolet (ethanol): 303 mμ (K 0.29, ε190)
237 mμ (K 22.8, ε8,580)

Infrared (KBr): 3.25 μ (=CH); 5.79 μ (acetate and $C_6$=O); 6.0 μ ($C_{20}$=O); 6.31 μ ($C_{16}$=$C_{17}$)

B. 5α,6,6-Trifluoro-3β-hydroxy-16-pregnen-20-one Acetate (3)

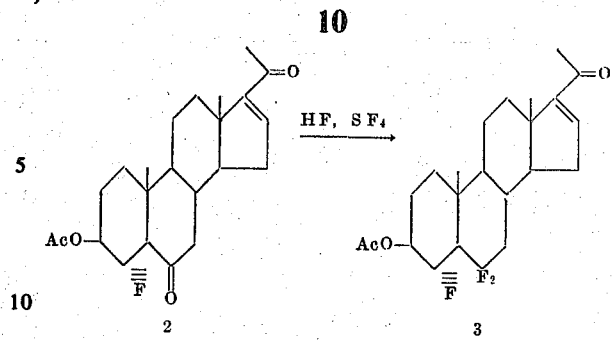

Steroid 2 (25 g, .0642 mole) from A above in 150 ml of methylene chloride and 6.3 ml of water (.35 mole) was reacted with 115 g (1.065 mole) of sulfur tetrafluoride at 10° for 18 hrs in a sealed Hastelloy bomb. The reaction was then poured into water and the separated organic layer washed with aqueous sodium bicarbonate, water and brine. It was dried (magnesium sulfate) and the solvent evaporated. The residue was chromatographed on 400 g of Florisil and eluted with 3 to 5 percent acetone-hexane to yield, after recrystallization from acetone-hexane, 24.0 g (91 percent). An analytical same was recrystallized twice from acetone-hexane, m.p. 177–178°C for 5α, 6, 6-trifluoro-3β-hydroxy-16-pregnen-20-one acetate (3)

Anal. Calcd. for $C_{23}H_{31}O_3F_3$: C, 66.96; H, 7.58; F, 13.82.

Found: C, 66.76; H, 7.65; F, 13.77

Ultraviolet (ethanol): 322 mμ (K 0.129, ε53)
237 mμ (K 23.6, ε 9,720)

Infrared (KBr): 5.77 μ (acetate C=O); 6.0 ($C_{20}$=O); 6.30 μ ($C_{16}$=$C_{17}$)

C. 5α,6,6-Trifluoro-3β-hydroxy-16-pregnen-20-one (4)

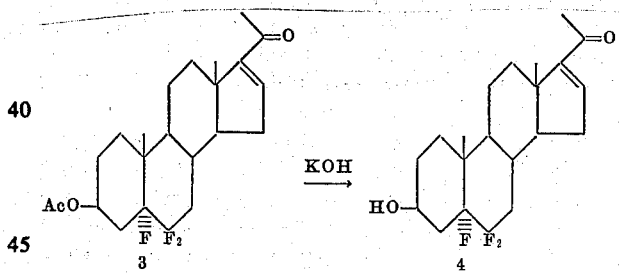

Potassium hydroxide (8.2 g, 0.147 mole) in 20 ml of water was added to 800 ml of tetrahydrofuran and 250 ml of methanol. The solution was cooled to 0°C and purged with nitrogen. Steroid 3 (57 g, 0.139 mole) in 350 ml of tetrahydrofuran was added. The solution was stirred at 0 to 5° C for 1 hr. then poured into 5 l. of water and vigorously stirred. The resulting solid was filtered and dried under vacuum to give 50.2 g (98.5 percent) of material. A small sample was chromatographed on Florisil (eluted with 15 percent acetone-hexane) to give, after recrystallization from acetone-hexane, an analytical sample, m.p. 182–183°C for 5α,6,6-trifluoro-3β-hydroxy-16-pregnen-20-one (4).

Anal. Calcd. for $C_{21}H_{29}F_3O_2$: C, 68.07; H, 7.89; F, 15.38;

Found: C, 68.32, 68.46; H, 7.74, 7.82; F, 15.45, 15.40;

Ultraviolet (ethanol): 322 mμ (K 0.147, ε54); 237 mμ (K 25.9, ε 9,580)

Infrared (KBr): 2.99 μ (OH); 6.00 and 6.01 μ ($C_{20}$=O); 6.31 μ ($C_{16}$=$C_{17}$).

D. 6,6-Difluoro-4,16-pregnadien-3,20-dione (6)

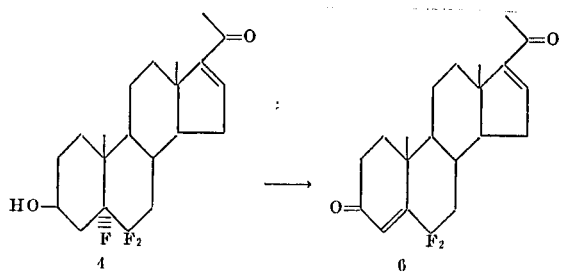

Steroid 4 (18.7 g, .0505 mole) in 300 ml of acetone at 0°C was treated with Jones reagent until a persistent red color was obtained. The reaction was also followed to completion by observing the disappearance of starting material by thin-layer chromatography (5 percent ethyl acetate-chloroform; silica gel plates). Methanol was added to quench excess reagent. The mixture was then filtered and the filtrate concentrated, then diluted with water. Extraction with methylene chloride gave a semi-solid residue (5α,6,6-trifluoro-16-pregnen-3,20-dione, product of equation (e) in the previously mentioned reaction scheme) which was chromatographed directly on alumina III (500 g) and eluted with benzene to yield 14.0 g (79.5 percent). An analytical sample of the 6,6-difluoro-4,16-pregnadien-3,20-dione (6) was crystallized twice from acetone-hexane, m.p. 118.5-119.0°C.

Anal. Calcd. for $C_{21}H_{26}O_2F_2$: C, 72.39; H, 7.52; F, 10.91.

Found: C, 72.46; H, 7.64; F, 11.13.

Ultraviolet (ethanol): 325 mμ (K 0.23, ε 80)
234 mμ (K 62.3, ε21,700) Infrared (KBr): 32.5 μ (=CH); 5.90 μ ($C_3$=O); 6.02 μ ($C_{20}$=O); 6.29 μ ($C_{16}$=CB17).

E. 6,6-Difluoro-16α,17α-dihydroxy-4-pregnen-3,20-dione (7)

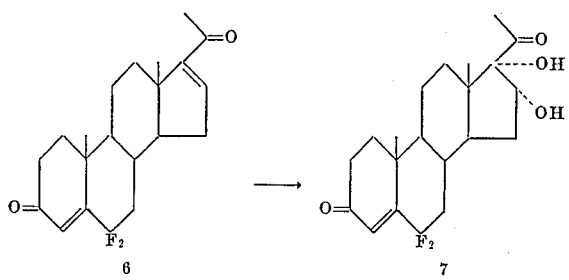

Steroid 6 (9.10 g, .026 mole) in 253 ml of acetone and 3.1 ml of glacial acetic acid was cooled to 3°C in an ice-bath. A solution of 4.10 g of potassium permanganate in 195 ml of 85 percent aqueous acetone (cooled to 3°C) was added in one portion. After 4 min. the reaction was treated with 42 ml of saturated aqueous sodium sulfite. It was then filtered through Celite and the filtrate extracted with methylene chloride. The organic extract was washed with water, brine, and dried with magnesium sulfate. The solvent was evaporated and the residue triturated with acetone to give 6 g of material. Recrystallization from acetone-hexane gave 4.0 g (40.5 percent) of 6,6-difluoro-16α,17α-dihydroxy-4-pregnen-3,20-dione (7) m.p. 202-207°C. An analytical sample was recrystallized three times from acetone-hexane, m.p. 213-217°C (sealed tube).

Anal. Calcd. for $C_{21}H_{28}O_4F_2$: C, 66.95; H, 7.38; F, 9.94
Found C, 66.17, 66.59, 65.97; H, 7.43, 7.47, 7.45; F, 9.53.

Ultraviolet (ethanol): 303 mμ (K 0.187, ε71)
227 mμ (K 32.8, ε12,500)
Infrared (KBr): 2.94 μ (OH); 3.25 μ (=CH); 5.88 μ ($C_{20}$=O) 5.98μ ($C_3$=O).

F. 6,6-Difluoro-11α,16α,17α-trihydroxy-4-pregnen-3,20-dione (8)

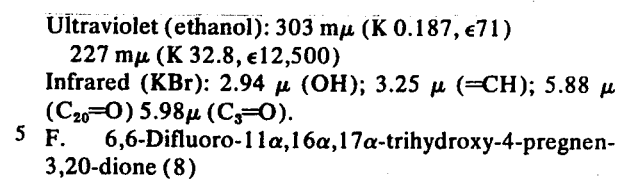

Six 250 ml flasks, each containing 0.5 g soybean meal, 2.0 g dextrose, 0.5 g yeast extract, 0.5 g sodium chloride, 0.5 g potassium phosphate (dibasic) and distilled water (100 ml) with the pH of the mixture adjusted to 6.5 with concentrated hydrochloric acid, was innoculated with Aspergillus ochraceus ATCC 18500. These flasks were placed on a rotary shaker and vigorously agitated for 48 hrs. at 29°C. After this time they were transferred to six 2 l. flasks (each containing 400 ml of the broth described above) and further grown at 29°C with agitation, for 24 hrs. Steroid 7 (1.0 g,2.62 mole) in 6 ml of dimethyl formamide was evenly distributed among the six flasks and shaking continued for 96 hrs. The contents of the flasks were then combined and filtered first through a coarse sintered glass filter then through Celite. The filtrate was then extracted with ethyl acetate (total of ca 6 l.). The organic extract was washed with water, brine dried (magnesium sulfate) and evaporated under nitrogen. The resulting residue was triturated with ethyl acetate to give 630 mg of a brown powder. The mother liquors from this trituration were chromatographed on silica gel (eluted with ethyl acetate) to yield an additional 133 mg of material. An anal-ytical sample of the 6,6-difluoro-11α,16α,17α-trihydroxy-4-pregnen-3,20-dione (8) was crystallized twice from acetone-hexane, m.p. 203-208°C.

Infrared (KBr): 2.89 and 3.02 μ (OH); 3.25 μ (=CH); 5.87 μ shoulder, 5.92 μ and 6.0 μ shoulder related to $C_{20}$=O, $C_3$=O and $C_4$=$C_5$.

G. 6,6-Difluoro-11α,16α,17α-trihydroxy-4-pregnen-3,20-dione 16,17-acetonide (9)

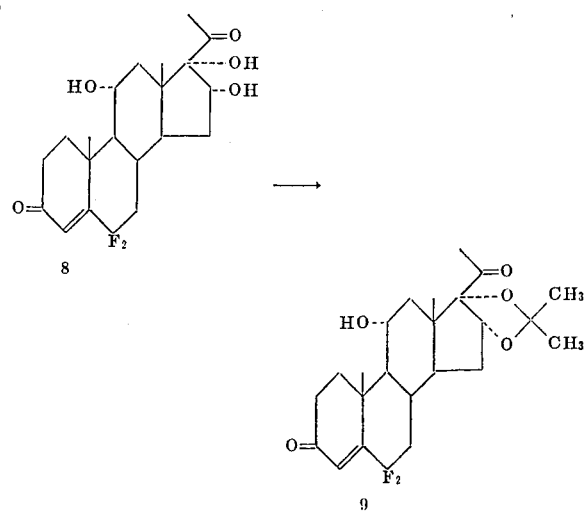

Steroid 8 (630 mg, 1.58 mmole) in 50 ml of acetone was treated with 1 drop of 37 percent hydrochloric acid. The progress of the reaction was followed by thin-layer chromatoatography (t.l.c.) (75 percent ethyl acetate:benzene; silica gel plates) and appeared complete for 20 hrs. The reaction was concentrated under vacuum to about 5 ml. The resulting precipitate was filtered to give 463 mg (one component by t.l.c. using silica gel plates with 75 percent ethyl acetate:benzene). Preparative t.l.c. yielded an additional 50 mg of product to give 513 mg (74 percent) overall of 6,6-difluoro-11α,16α,17α-tri-hydroxy-4-pregnen-3,20-dione 16,17-acetonide (9). An analytical sample was recrystallized twice from acetone-hexane, m.p. 300–302°C.

Anal. Calcd. for $C_{24}H_{32}F_2O_5$: C, 65.74; H, 7.36; F, 8.67.
Found: C, 65.93; H, 7.48; F, 10.26.
Ultraviolet (ethanol): 300 mμ (K 0.28, ε123
227 mμ (K 24.9, ε10,900)
Infrared (KBr): 2.88 μ (OH); 5.85 μ ($C_{20}$=O); 5.90 μ ($C_3$=O).

H. 6,6-Difluoro-11α,16α,17α-trihydroxy-4-pregnen-3,20-dione 16,17-acetonide 11-mesylate (10)

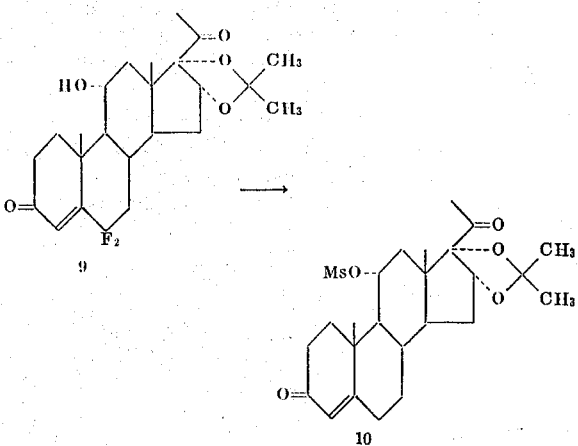

A solution of steroid 9 (330 mg, 0.75 mmole) in 2.5 ml of pyridine was treated with 0.57 ml of methanesulfonyl chloride and allowed to stand at 5°C for 24 hrs. The dark solution was diluted with 20 ml of methylene chloride, washed with 20 ml of 5 percent aqueous hydrochloric acid and with 20 ml of water. It was dried over magnesium sulfate and the solvent evaporated to give 490 mg of a yellow oil of the corresponding mesylate (10).
Infrared (neat): 5.85, 5.90 μ ($C_{20}$=O and $C_3$=O); 6.10 and 6.15 μ (ArC=C); 7.3 and 8.5 μ (—$SO_2$-O—)

I. 6,6-Difluoro-16α,17α-dihydroxy-4,9(11)-pregnadiene-3,20-dione 16,17-acetonide (11)

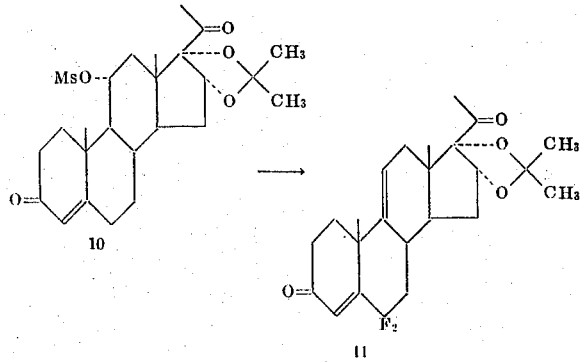

The mesylate steroid 10 (490 mg) as obtained above and 490 mg of anhydrous sodium acetate were mixed with 6 ml of glacial acetic acid and the mixture was refluxed for 2 hrs. It was then diluted with water and the resulting precipitate was filtered and air-dried to give 236 mg (75 percent from 9) of 6,6-difluoro-16α,17α-dihydroxy-4,9(11)-pregnadiene-3,20-dione 16,17-acetonide (11). An analytical sample was recrystallized from methylene chloride-petroleum ether, m.p. 225–227°C.
Anal. Calcd. for $C_{24}H_{30}O_4F_2$: C, 68.55; H, 7.19; F, 9.04.
Found: C, 68.14; H, 7.28
Ultraviolet (ethanol): sh 300 mμ (K32, ε 134); 226 mμ (K 34.4 ε, 14,400)

J. 6,6-Difluoro-9α-bromo-11β,16α,17α-trihydroxy-4-pregnen-3,20-dione 16,17-acetonide (12)

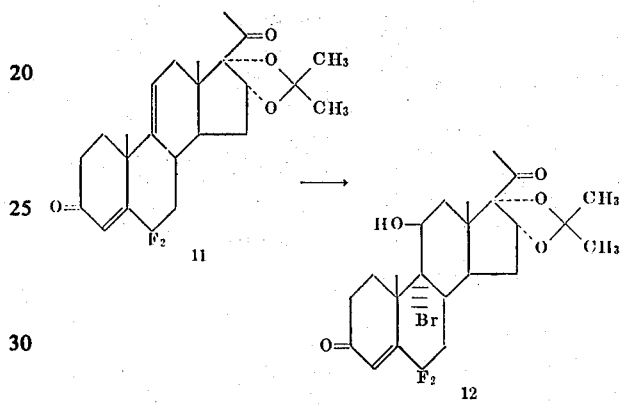

Steroid 11 (170 mg, 0.405 mmole) in 5 ml of dioxane was treated with 0.26 ml of 0.5N perchloric acid and 81 mg of recrystallized N-bromoacetamide. The reaction was stirred at 25°C, in the dark, for 4 hrs. An aqueous solution of 120 mg of sodium bisulfite in 3 ml of water was added dropwise to discharge the yellow color. The reaction was then diluted with ice water (20 ml) and extracted with methylene chloride. The organic extracts were washed three times with an equal volume of water, then brine and finally dried (magnesium sulfate) and the solvent evaporated to give 251 mg of a yellow oil of 6,6-difluoro-9α-bromo-11β,16α, 17α-trihydroxy-4-pregnen-3,20-dione 16,17-acetonide (12) Infrared (neat): 290 μ (OH); 5.88 μ ($C_{20}$=O); 5.95 μ ($C_3$=O).

K. 6,6-Difluoro-16α,17α-dihydroxy-9β,11β-epoxy-4-pregnen-3,20-dione 16,17-acetonide (13)

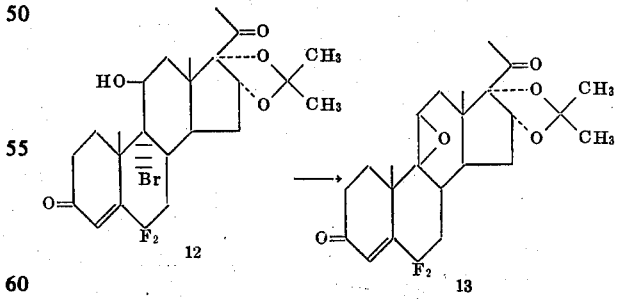

The steroidal bromohydrin 12 (251 mg) as obtained above was taken up in 10 ml of acetone, treated with 310 mg of anhydrous potassium acetate and refluxed for 2 hours. The acetone was evaporated under vacuum and the residue diluted with icewater. The resulting precipitate was filtered and dried to yield 159 mg. Recrystallization from acetone-hexane gave 145 mg. m.p. 201.5–203.0°C of 6,6-difluoro-16α,17α-dihydroxy-9β,11β,epoxy-4-pregnen-3,20-dione 16,17-acetonide (13).

IR Infrared (KBr): 5.84 μ ($C_{20}$=O); 5.92 μ ($C_3$=O).
Ultraviolet (EtOH): 300 mμ (K 0.28, ε 123) 227 mμ (K 25.8, ε 11,400)
NMR (CDCl$_3$): 46 cps (H-18); 70 and 88 cps (acetonide CH$_3$'s); 92 cps (H-19; 214 cps (H-11); 301 and 306 cps (H-16); 279 and 283 cps (H-4).

L. 6,6,9α-Trifuluoro-11β,16α,17α-trihydroxy-4-pregnen-3,20-dione 16,17-acetonide (14)

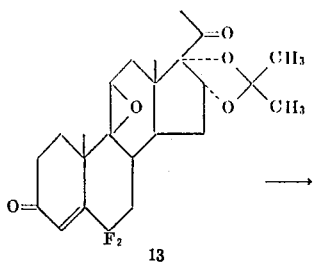

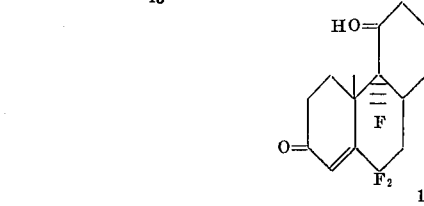

Steroid epoxide 13 above (111 mg, 0.257 mmole) was mixed with 4 ml of urea-hydrogen fluoride complex and the reaction stirred at 25° for 5 hrs. The reaction was then poured into a mixture of 10 ml of concentrated ammonium hydroxide and 50 g of ice. The resulting precipitate was filtered, washed well with water and dried to yield 60 mg. This material was then chromatographed on 2 g of Florisil and eluted with acetone-hexane fractions to give 45 mg. of 6,6,9α-Trifluoro-11β,16α,17α-trihydroxy-4-pregnen-3,20-dione 16,17-acetonide after recrystallization from acetone-hexane, m.p. 234–235°C.

Anal. Calcd. for $C_{24}H_{31}O_5F_3$: C, 63.14; H, 6.84.
Found: C, 63.14; H, 6.93.

M. 6,6,9α-Trifluoro-11β,16α,17α,21-tetrahydroxy-1,4-pregnadien-3,20-dione 16,17-acetonide 21-acetate (17).

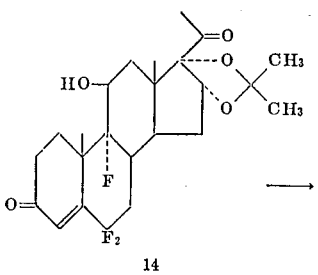

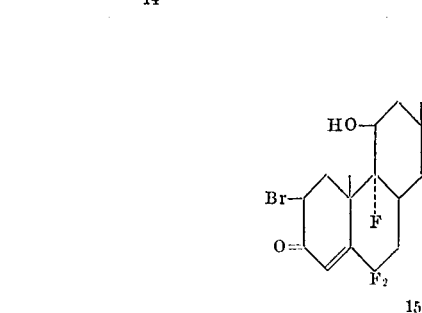

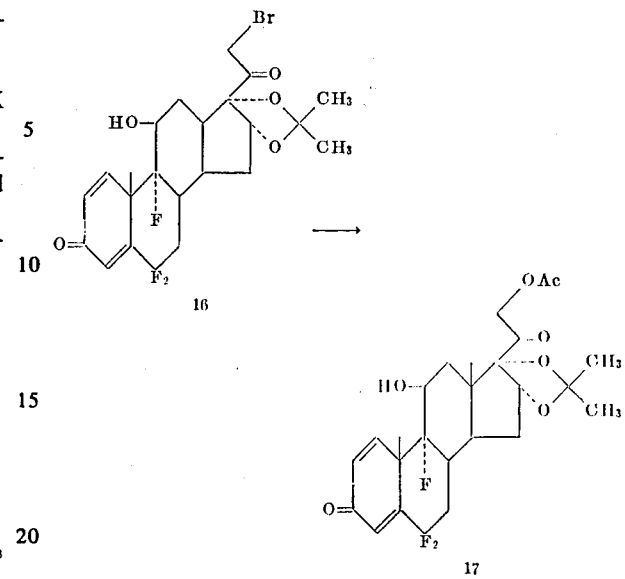

6,6,9α-Trifluoro-11β,16α,17α-trihydroxy-4-pregnen-3,20-dione 16,17-acetonide (100 mg) in 10 ml of tetrahydrofuran at 50°C was treated with 165 mg pyridinium bromide perbromide. The mixture was stirred at 50 to 60°C for 1 hr. after which time an additional 90 mg of pyridinium bromide perbromide was added. Stirring was continued at 50 to 60°C for 4 hrs. The reaction was poured into ice-water and the precipitate filtered. The solid was crystallized from acetone-hexane after treatment with charcoal to yield 66 mg of 2,21-dibromo-6,6,9α-trifluoro-11β,16α,17α-trihydroxy-4-pregnan-3,20-dione 16,17-acetonide (15). This material (66 mg) with 100 mg anhydrous lithium chloride and 4 ml of dimethyl formamide was refluxed for 8 hrs. at which point an additional 100 mg of lithium chloride was added. Refluxing was continued for 4 hrs. then the reaction was cooled, poured into ice water and the precipitate filtered and dried to give 50 mg of 21-bromo-6,6,9α-trifluoro-11β,16,17α-trihydroxy-1,4-pregnadien-3,20-dione 16,17-acetonide (16). This crude material (50 mg), 25 mg of potassium acetate and 5 ml of dimethylformamide were heated at 90°. When complete, as determined by thin-layer chromatography, the reaction was poured into water and extracted with methylene chloride. The organic extracts were washed with water, brine, dried (MgSO$_4$) and concentrated. The residue was chromatographed on 3 g of Florisil and eluted with acetone-hexane mixtures to give 6,6,9α-trifluoro-11β,16α,17α,21-tetrahydroxy-1,4-pregnadien-3,20-dione 16,17-acetonide 21-acetate, m.p. 284–286°C (17).

N. 21-Chloro-6,6,9α-trifluoro-11β,16α,17α-trihydroxy-1,4-pregnadien-3,20-dione 16,17 acetonide (19)

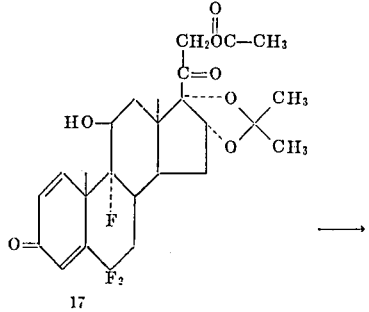

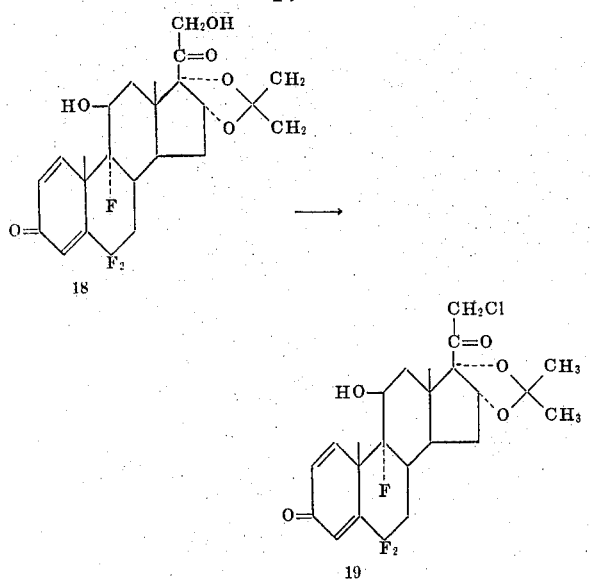

A sample of 21-acetate (17) was hydrolyzed with potassium carbonate and water in tetrahydrofuran-methanol solution. The crude 6,6,9α-trifluoro-11β,16α,17α-tetrahydroxy-1,4-pregnadien-3,20-dione 16,17-acetonide (100mg) (18) in 3 ml of pyridine at 0° was treated with 34 μl of methane-sulfonyl chloride. The solution was allowed to warm to 25° and was stirred for 24 hrs. In was then poured into water and the resulting precipitate filtered. This solid was taken up up in 15 ml of methylene chloride, dried (anhydrous magnesium sulfate), and the solution was then added slowly to a refluxing mixture of 70 mg of lithium chloride in 6 ml of dimethylformamide. The reaction was refluxed for 1 hr. after the addition was complete and then allowed to stand at 25° for 25 hrs. It was poured into icewater and the precipitate filtered. Crystallization from acetone-hexane gave 60 mg, m.p. 285–287° C of 21-chloro-6,6,9α-trifluoro-11β,16α,17α-trihydroxy-1,4-pregnadien-3,20-dione 16,17-acetonide (19).

Ultraviolet: $\lambda_{max}^{EtOH}$ 234mμ (ε, 16,100) 297mμ (K 0.49)
Mass Spectrum: Calcd. for $C_{24}H_{28}O_5F_3Cl$: 488.1576
Measured: 488.1582

The processes described give biologically active steroids. Compounds 5-11 exhibit pregestational and antiandrogenic properties and compounds 12-15 show anti-inflammatory effects. These compounds are also intermediates in the preparation of compounds 16-19 which are highly active glucocorticoidal and antiinflammatory agents. The excellent topical and oral antiinflammatory activity is shown by the following procedure:

Topical Antiinflammatory Assay (rat ear assay)

Intact male 21-day-old rats (60–70 g.) were anesthetized and the test compound in a vehicle of 20 percent pyridine, 5% distilled water, 74 percent diethyl ether, and 1 percent croton oil by volume was applied to the left ear, 0.05 ml. to the inside of the ear and 0.05 ml. to the outside. One group of 9 rats received vehicle only, 3 groups (six to seven rats per group) received 3X dose increments of compound in vehicle, and 3 groups (six to seven rate per group) received 3X dose increments of fluocinolone acetonide, the test standard, in vehicle. Six hours later, the rats were sacrificed and ear pieces of uniform size were punched out with a No. 4 cork borer. The ear pieces were weighed, and the mean weights for the control and test substance-treated groups were calculated. Plots of percent decrease from control versus log dose were made, and the doses of the compound and of test standard (in mg. per kg. of body weight) which caused a 30 percent reduction from control ear pieces weight were determined from dose-response lines fitted visually. ED30% values were compared to give potency ratios of compounds with respect to fluocinolone acetonide.

Compound 19 exhibited substantially the same activity as fluocinolone acetonide at dosages employed (0.1,0.3,0.9 and 2.7μg). Compound 17 was about 0.4 as potent. These compounds were 150 and about 20 times as effective respectively as hydrocortisone.

The embodiments of the invention in which an exclusive property or privilege is claimed are defined as follows:

1. A steroid compound having the formula

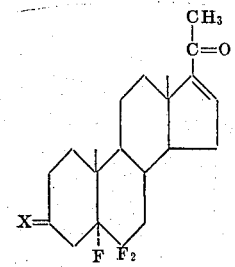

wherein X is

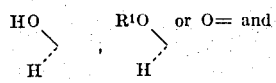

$R^1$ is acyl of up to 4 carbon atoms.

2. A steroid compound according to claim 1 wherein X is

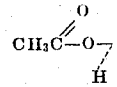

5α,6,6-trifluoro-3β-hydroxy-16-pregnen-20-one acetate.

3. A steroid compound according to claim 1 wherein X is

5α,6,6-trifluoro-3β-hydroxy-16-pregnen-20-one.

4. A steroid compound according to claim 1 wherein X is O; 5α,6,6-trifluoro-16-pregnen-3,20-dione.

5. A steroid compound having the formula

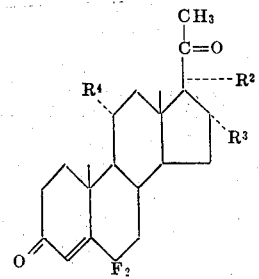

wherein
$R^2$ and $R^3$ are each OH, or together are a double bond between the C–16 and C–17 carbon positions and $R^4$ is H or OH, with the proviso that $R^4$ is H when $R^2$ and $R^3$ are a double bond.

6. A steroid compound according to claim 5 wherein $R^2$ and $R^3$ together are a double bond between the C-16 and C-17 carbon positions and $R^4$ is H; 6,6-difluoro-4,16-pregnadiene-3,20-dione.

7. A steroid compound according to claim 5 wherein $R^2$ and $R^3$ are each OH and $R^4$ is H; 6,6-difluoro-16α,17α-dihydroxy-4-pregnen-3,20-dione.

8. A steroid compound according to claim 5 wherein $R^2$, $R^3$ and $R^4$ are each OH; 6,6-difluoro-11α,16α,17α-trihydroxy-4-pregnen-3,20-dione.

* * * * *

Disclaimer 3,718,673.—*William Charles Ripka*, Wilmington, Del. PROCESS FOR THE PREPARATION OF 21-CHLORO-6,6,9ALPHA-TRIFLUORO-11BETA, ALPHA, 17ALPHA-TRIHYDROXY - 1,4 - PREGNA-DIEN-3,20-DIONE 16,17-KETALS AND SELECTED INTERMEDIATES. Patent dated Feb. 27, 1973. Disclaimer filed Mar. 1, 1974, by the assignee, *E. I. du Pont de Nemours and Company*.

Hereby enters this disclaimer to claims 5 and 7 of said patent.

[*Official Gazette August 27, 1974.*]